Aug. 8, 1950

N. H. YOUNG, JR 2,517,618

DETECTOR FOR TIME MODULATED PULSES

Filed Feb. 19, 1945

2 Sheets-Sheet 1

INVENTOR.
NORMAN H. YOUNG, JR.
BY Percy P. Lantzy
ATTORNEY

Aug. 8, 1950 N. H. YOUNG, JR 2,517,618

DETECTOR FOR TIME MODULATED PULSES

Filed Feb. 19, 1945 2 Sheets-Sheet 2

INVENTOR.
NORMAN H. YOUNG, JR.
BY Percy P. Lantzy
ATTORNEY

Patented Aug. 8, 1950

2,517,618

UNITED STATES PATENT OFFICE 2,517,618

DETECTOR FOR TIME MODULATED PULSES

Norman H. Young, Jr., Jackson Heights, N. Y., assignor to Federal Telephone and Radio Corporation, New York, N. Y., a corporation of Delaware Application February 19, 1945, Serial No. 578,682

8 Claims. (Cl. 250—27.1)

This invention relates to radio reception of T. M. (time modulated) signal pulse energy and more particularly to means for demodulating the T. M. pulses and reducing interference accompanying the pulses.

In my copending application Serial No. 517,160, filed January 6, 1944, now U. S. Patent 2,413,023, which is assigned to Federal Telephone and Radio Corporation, I disclose a T. M. signal pulse demodulator and blocking system particularly useful in reception of push-pull type of T. M. pulse modulation. By "push-pull" I have reference to the type of pulse modulation wherein alternate pulses are displaced in time in opposite directions by amounts corresponding to substantially the instantaneous amplitude of a modulating signal wave. This type of modulation may be of a symmetrical or unsymmetrical character. The pulses for symmetrical time modulation are equally spaced in the absence of modulation. The pulses in the case of unsymmetrical time modulation are initially offset in their time relation.

The blocking feature of my aforesaid copending application includes the provision of a blocking wave of a character capable of blocking substantially the entire interval occurring between the maximum limits of modulation displacement of successive pulses.

The demodulation feature of my aforesaid copending application includes the provision of a demodulating wave having substantially linear voltage variation characteristics which, when combined with the signal pulses, produce a pulse output varying in amplitude corresponding to the time displacement of the signal pulses.

Separate objects of the present invention are to provide in a signal receiver, means to produce a composite or other special wave having certain characteristics capable of effecting simultaneously the interference blocking and the demodulation of the signal pulses; means to derive said wave from the signal energy; and a circuit arrangement for applying said wave to the signal energy to effect said simultaneous blocking and demodulation operation.

According to a feature of my invention, the composite wave may be produced by first producing an oscillatory wave in synchronism with the normal or unmodulated recurrence rate of the signal pulses and second to produce substantially rectangular pulses timed according to the timing of the signal pulses in the absence of modulation. The oscillatory wave is suitably phased with respect to the rectangular pulses and combined therewith to produce the desired composite wave which includes pedestal-like pulse portions corresponding to the timing of the rectangular pulses and having voltage variation characteristics according to the corresponding parts of the oscillatory wave. The portions of the oscillatory wave selected for shaping the tops of the pedestal-like pulses preferably include only the linear portions of the oscillatory wave although this is not necessary in some forms of signalling.

The composite wave may be applied before or after the detector stage. If applied before the detector stage, the composite wave is used to control the sensitivity of one of the carrier frequency amplifiers whereby the signal component of the carrier is increased in voltage according to the pedestal pulse portions of the wave. Where the composite wave is applied to an amplifier following the detector, the operation is the same with respect to the signal pulse component. In either case the same amplifier or a subsequent amplifier is provided for threshold clipping the pulse energy so as to eliminate the composite pulse energy and interference occurring between the signal pulses.

For a better understanding of the objects and features of my invention, reference may be had to the following detailed description to be considered with the accompanying drawings in which.

Figure 1:
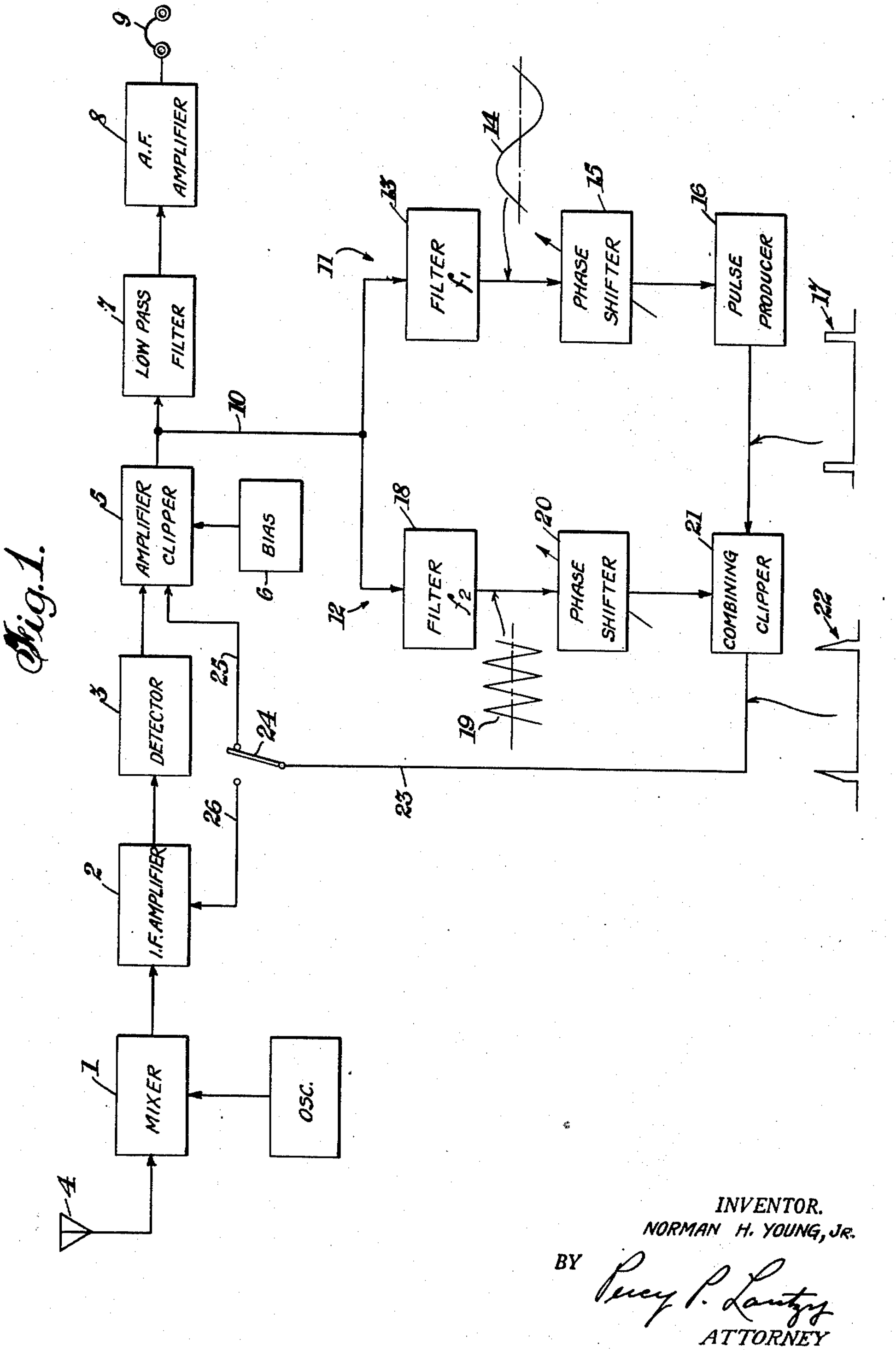
Fig. 1 is a block diagram of a receiver according to my invention.

The receiver shown in Fig. 1 of the drawings includes a mixer 1, an intermediate frequency amplifier 2, and detector 3 of the character commonly used in the heterodyne type of receiver. It will be understood, however, that a broad band type of receiver other than the heterodyne type may be employed if desired. The carrier of the signal energy is applied to the mixer 1 from antenna 4, where the frequency of the carrier is reduced to an intermediate frequency and applied to amplifier 2 where it may be further reduced in frequency or applied directly to a detector 3. The output of the detector 3 is applied to an amplifier clipper 5 which according to my invention is preferably biased as indicated at 6 to cut off at a given voltage level. The pulse energy exceeding this voltage level is applied to low pass filter 7 for removal of the pulse components of the signal wave, the output of which is then applied to an audio frequency amplifier 8 and then to earphones 9 or other utilization apparatus. The output of amplifier 5 is also applied over connection 10 to a pair of parallel circuits 11 and 12. The circuit 11 includes a filter preferably of the quartz crystal type although other types having equivalent selectivity may be used in order that the filter will remove amplitude modulation components from the energy received from amplifier 5. The filter 13 is preferably tuned or selected for passing a wave component 14 of a frequency $f_1$ corresponding to the pulse recurrence rate of the signal pulses. The wave energy 14 is applied to a phase shifter 15 and then to a known type of pulse producer 16 whereby a train of substantially rectangular pulses 17 are produced having a recurrence rate corresponding to the frequency of wave 14. The phase shifter 15 is adjusted to control the timing of the pulses 17 so that they will coincide with the signal pulses, the width or duration of the pulses 17 being such as to include the maximum degree of time displacement of the signal pulses.

The circuit 12 includes a filter 18 which may be of the same character as the filter 13 except that it is tuned for passing wave energy 19 of a frequency $f_2$ bearing an odd harmonic relationship with respect to the normal recurrence rate of the signal pulse pairs. The wave 19 is suitably phased at 20 and applied to a combining clipper 21 of known character whereby portions of the wave 19 combine with the rectangular pulse energy 17 to produce above the clipping level of the clipper a pedestal-like pulse wave 22. The phasing of the wave 19 is preferably selected to cause the linear portions of the wave to coincide with the rectangular pulses thereby shaping the top portions of the pulses according to the linear characteristics of the wave. The pedestal pulses 22 are applied over connection 23 to either the intermediate frequency amplifier 2 or the amplifier clipper 5. As shown, the pedestal pulses are applied over switch 24 and connection 25 to amplifier clipper 5. If desired, the pedestal pulses 22 may be applied to the intermediate frequency amplifier 2 by shifting the switch 24 to connection 26.

Figure 2:
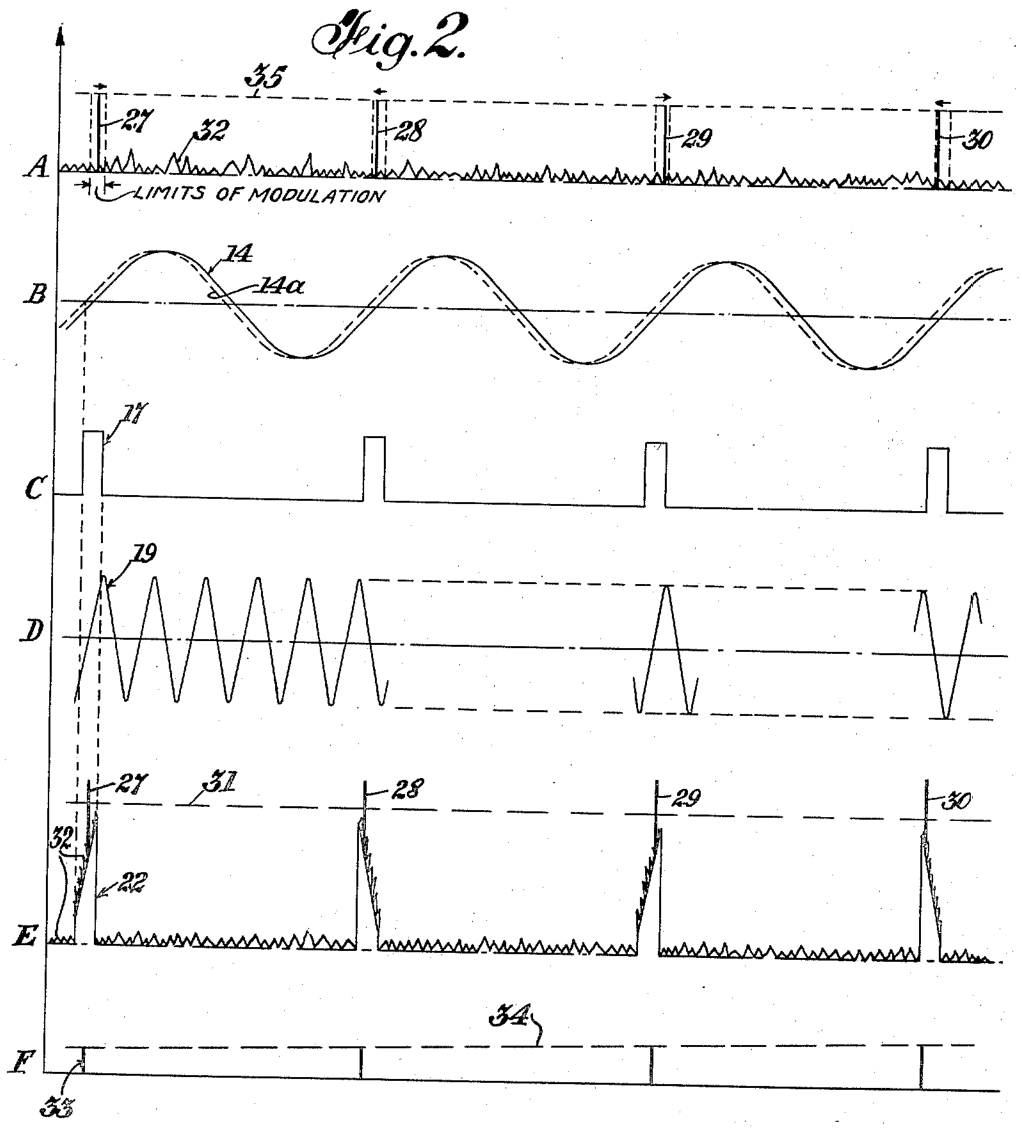
Fig. 2 is a graphical illustration helpful in explaining the invention.

Referring to Fig. 2 of the drawing, graph A represents a train of signal pulses 27, 28, 29 and 30 displaced in push-pull manner as indicated by the arrows directly above the pulses and according to a modulating wave of progressively increasing amplitude (see wave 34 of graph F). Graphs B and C represent the wave 14 and the rectangular pulses 17 produced by the circuit 11. The position of the wave 14 indicated by broken lines at 14*a* may be regarded as representing a desired phased position of the wave for timing of the output pulses 17 relative to the average timing of the signal pulses of graph A. Graph D shows a preferred phase condition of the wave 19 produced by circuit 12. Graph E shows the output pedestal pulses 22 from clipper 21 together with the signal pulse energy superimposed thereon as it might occur in amplifier clipper 5. The clipping level to which the clipper 5 is biased by bias 6 is indicated at 31. This level is preferably selected so as to exceed the maximum amplitude of the pedestal pulses 22 plus the usual interference such as static and the like indicated at 32 so that substantially only pulse energy corresponding to the signal pulses is passed by the amplifier clipper 5. Thus, output pulse energy 33 varying in amplitude according to the time modulation of the signal pulses is obtained as indicated by graph F.

It will be clear from the graphs of Fig. 2 that the push-pull modulation of the signal pulses of graph A is translated linearly into amplitude modulated energy. Since the wave 19 is selected as an odd harmonic of the wave 14, the alternate pedestal pulses are provided with oppositely disposed inclinations at the topside thereof. Thus, signal pulses modulated in push-pull time displacement according to a portion of a signal wave which increases progressively results in linear translation of the time displacements of all signal pulses into amplitude variations. By suitably filtering the pulse output to remove the pulse components an audio wave such as indicated by the broken line 34, is produced substantially identical to the original modulating signal wave.

Should the pedestal pulses 22 be applied to the intermediate frequency amplifier 2 instead of clipper 5, the operation just described in connection with clipper 5 will occur in amplifier 2 except for the threshold clipping level. The clipper 5 however will continue to function as the threshold clipper for removal of the wave components included in the output of clipper 5. It will be understood, of course, that where the pedestal pulses are applied to an amplifier or other stage different from amplifier clipper 5, the stage may be provided with a suitable bias for threshold clipping. It will also be understood that if desired the signal input to the receiver may be limit clipped as indicated at 35, graph A in one or more of the stages preceding the demodulation stage.

While I have illustrated the principles of my invention in connection with push-pull time modulated pulses, it will be clear from the foregoing description that the principles of my invention are also applicable to other forms of pulse modulation. It is to be understood, therefore, that the particular apparatus herein disclosed is to be regarded as one example of the invention only and not as a limitation of the scope of the invention set forth in the objects and appended claims.

I claim:

1. In a receiver for push-pull time modulated signal pulses, valve means for passing current when the voltage applied thereto exceeds a given voltage level, means for producing an oscillatory wave having an odd harmonic relationship with the normal recurrence rate of pairs of said signal pulses, means for producing substantially rectangular pulses timed according to the timing of said signal pulses in the absence of modulation, means to combine said wave and said rectangular pulses to produce energy having pedestal-like pulses corresponding to the timing of said rectangular pulses and having voltage variation characteristics according to corresponding parts of said wave, and means to apply to said valve means said pedestal-like pulses for coincidence with said signal pulses to increase the voltage of the signal pulses above said voltage level and thereby produce current flow through said valve means proportional to the push-pull time displacement of said signal pulses relative to the variation characteristics of said pedestal-like pulses.

2. A receiver according to claim 1 wherein said valve means includes an amplifier and means for biasing said amplifier to cut off at a given voltage level.

3. In a receiver for push-pull time modulated signal pulses, valve means for passing current when the voltage applied thereto exceeds a given voltage level, means for producing an oscillatory wave of an odd harmonic relationship with respect to the normal recurrence rate of pairs of said signal pulses, means for producing substantially rectangular pulses timed according to the timing of said signal pulses in the absence of modulation, means to combine said wave and said rectangular pulses to produce energy having pedestal-like pulse portions the top of which vary substantially linearly in amplitude, alternate pulse portions having oppositely disposed voltage variations, and means to apply to said valve means said pedestal-like pulses for coincidence with said signal pulses to increase the voltage of the signal pulses above said voltage level and thereby to produce current flow through said valve means proportional to the time displacements of said signal pulses relative to the variations of said pedestal-like pulses.

4. A receiver according to claim 3 wherein the means for combining said wave and said rectangular pulses includes energy phasing means to effect coincidence of said rectangular pulses with substantially linear portions of said wave.

5. In a receiver, valve means, means to apply signal pulses to said valve means, a pair of circuits connected in parallel to the output of said valve means; one of said circuits including a first wave producer and a phase shifter; and the other of said circuits including a second wave producer, a phase shifter and a pulse producer for producing substantially rectangular pulses from the wave produced by said second wave producer; means to combine the output energies of said pair of circuits, and means to apply the combined energy to said valve means.

6. A receiver according to claim 5 wherein said first wave producer includes means for producing a wave having an harmonic relationship with respect to the average recurrence rate of said signal pulses and said second wave producer includes means for producing a wave having a frequency corresponding to the average recurrence rate of said signals.

7. A receiver according to claim 5 wherein said first and second wave producers include filters of the quartz crystal type.

8. In a receiver having a carrier frequency amplifier, means for producing energy having a pedestal pulse, the tops of which vary substantially linearly in amplitude, means for applying said pedestal pulse to said amplifier for coincidence with the carrier frequency of the constant amplitude time modulated signal pulses, thereby increasing the voltage of the signal pulse components of said carrier and simultaneously translating the time displacements thereof into amplitude variations, the means for producing pedestal pulse energy including means for detecting the carrier energy output of said amplifier, a pair of circuits connected to receive in parallel the threshold clipped energy; one of said circuits including a first wave producer and a phase shifter; and the other of said circuits including a second wave producer, a phase shifter and a pulse producer for producing substantially rectangular pulses from the wave produced by said second wave producer; and means to combine the output energies of said pair of circuits.

NORMAN H. YOUNG, Jr.

REFERENCES CITED

The following references are of record in the file of this patent:

UNITED STATES PATENTS

| Number | Name | Date |
|---|---|---|
| 2,048,081 | Riggs | July 21, 1936 |
| 2,258,943 | Bedford | Oct. 14, 1941 |
| 2,273,193 | Heising | Feb. 17, 1942 |
| 2,277,000 | Bingley | Mar. 17, 1942 |
| 2,352,634 | Hull | July 4, 1944 |
| 2,391,776 | Fredendall | Dec. 25, 1945 |
| 2,413,023 | Young | Dec. 24, 1946 |
| 2,416,306 | Grieg | Feb. 25, 1947 |
| 2,419,570 | Labin et al. | Apr. 29, 1947 |